United States Patent
Moehler et al.

(10) Patent No.: US 7,859,673 B2
(45) Date of Patent: Dec. 28, 2010

(54) METHOD AND ARRANGEMENT FOR DETECTING LIGHT SIGNALS

(75) Inventors: Gunter Moehler, Jena (DE); Dietmar Schmidt, Bibra (DE); Mirko Liedtke, Jena (JP)

(73) Assignee: Carl Zeiss MicroImaging GmbH, Jena (DE)

(*) Notice: Subject to any disclaimer, the term of this patent is extended or adjusted under 35 U.S.C. 154(b) by 584 days.

(21) Appl. No.: 11/822,152

(22) Filed: Jul. 2, 2007

(65) Prior Publication Data
US 2008/0008479 A1    Jan. 10, 2008

(30) Foreign Application Priority Data
Jul. 1, 2006    (DE) ................ 10 2006 030 530

(51) Int. Cl.
*G01N 21/55* (2006.01)
*H03K 19/14* (2006.01)

(52) U.S. Cl. ............. 356/445; 250/214 R; 250/214 LS
(58) Field of Classification Search ........... None
See application file for complete search history.

(56) References Cited

U.S. PATENT DOCUMENTS

| | | | | |
|---|---|---|---|---|
| 3,177,469 | A | * | 4/1965 | Chow .......... 382/202 |
| 3,624,604 | A | * | 11/1971 | Gibbard ........ 382/190 |
| 4,809,194 | A | * | 2/1989 | Crookshanks ... 382/278 |
| 6,747,737 | B2 | | 6/2004 | Wolleschensky et al. |
| 7,009,699 | B2 | | 3/2006 | Wolleschensky et al. |
| 2002/0177777 | A1 | * | 11/2002 | Nordstrom et al. ...... 356/342 |
| 2003/0183754 | A1 | | 10/2003 | Wolleschensky et al. |
| 2003/0184558 | A1 | * | 10/2003 | Ohba .............. 345/592 |
| 2004/0131348 | A1 | | 7/2004 | Ohba et al. |
| 2004/0264765 | A1 | | 12/2004 | Ohba |
| 2006/0203241 | A1 | | 9/2006 | Schreiber |

FOREIGN PATENT DOCUMENTS

| | | |
|---|---|---|
| DE | 10033179 | 1/2002 |
| DE | 10253108 | 5/2004 |
| DE | 10319776 | 11/2004 |
| EP | 1308715 | 5/2003 |
| JP | 2006154376 A * | 6/2006 |

OTHER PUBLICATIONS

English Abstract for JP 2006154376 A-Jun. 2006.*
Becker et al., "FRET Measurements by TCSPC Laser Scanning Microscopy", Proceedings of SPIE, vol. 4431, Nov. 2001, pp. 94-98.

* cited by examiner

*Primary Examiner*—Gregory J Toatley
*Assistant Examiner*—Juan D Valentin
(74) *Attorney, Agent, or Firm*—Jacobson Holman PLLC

(57) ABSTRACT

A method for detecting and analyzing light signals, in which a light signal impinges an optoelectric converter, where it is converted into an electric signal and the electric signal subsequent to the conversion is distributed into several analysis channels (13.1-13.4), within each analysis channel (13.1), (i) a signal analysis is performed, which is different from the signal analysis for the other analysis channels (13.2-13.4) and (ii) an output signal is created. In such a method, one or more output signals are selected for further processing and output using a specified, changeable selection criterion.

29 Claims, 3 Drawing Sheets ated to the examination method. Each of these detection methods has its own characteristic and is generally particularly well suited for one or several of the examination methods, but poorly adapted for other methods.

METHOD AND ARRANGEMENT FOR DETECTING LIGHT SIGNALS

BACKGROUND OF THE INVENTION (1) Field of the Invention

The invention relates to a method for detecting light signals, in which a light signal impinges on an optoelectronic converter, where the light is converted into an electric signal, and in which, after the conversion, the electric signal is distributed to several analysis channels. Here, in each analysis channel (i) a signal analysis is performed, which is different from the signal analyses for the other analysis channels and (ii) an output signal is produced. The invention relates to the problems found in optic examination methods, especially in microscopy, where many different types of detection methods can be used. Each of the methods has advantages and disadvantages and some of the methods may beneficially be used only in special examination methods. For this reason, detection methods are frequently used alternately or in combinations. The invention also relates to a detector module for detecting and analyzing light signals as well as the use of such a detector module in a laser-scanning method.

(2) Description of the Related Art

In microscopy, in general, and in laser-scanning microscopy, in particular, there are a multitude of different examination methods, each requiring a detection method adjusted to the examination method. Each of these detection methods has its own characteristic and is generally particularly well suited for one or several of the examination methods, but poorly adapted for other methods.

A widely used method is the integration of signals within a defined measurement period with a subsequent analogue-digital conversion, for example. Usually capacitors are used for the integration and collect a charge in a specified measurement period. Light signals are converted into electric signals by an optoelectronic converter, so that the charge collected in the measurement period corresponds to the light intensity. Between two integration processes, the capacitor must be discharged and/or removed, so that a certain downtime develops, in which no integration can occur. Up to 30% of the overall time is required to discharge the integration capacitor, in which time no signal can be detected; as a consequence loss of sensitivity develops. In this case the so-called odd/even variant is often used as a solution. Here, while one capacitor is prepared for the next integration process, i.e. its charge is being removed, another capacitor is used for integration. This integration method has a very wide dynamic range when the integration time constant is adjusted appropriately. The loss in sensitivity can be avoided in the odd/even variant; however, in this method lines develop in the image, which result from the tolerances of the two integrators and their parts during switching.

Another method is to count individual photons. This method is very sensitive; however it only has a narrow dynamic range and is therefore only operational to a limited extent. The same applies to the so-called 2D-photon counting, such as for example described in US 2003/0183754 A1. When a photon multiplier, for example a photomultiplier-tube (PMT), is used as a detector, the highest possible voltage must be connected for detecting individual photons in order to receive a signal. When several photons simultaneously impinge the detector, they have no influence on the intensity of the signal, because the signal is already at maximum level with a single photon. There is therefore no difference between the impingement of few or many photons; the dynamics are therefore very low.

Furthermore, a method that can be easily implemented is the so-called oversampling method. This method is particularly well suited to scan a changing signal because the signal is scanned at a higher scanning frequency than actually necessary to represent the band of the signal. This way, during the measurement period the signal-to-noise ratio can be influenced.

In addition to these standard methods in laser scanning microscopy, additional detection methods are used specially adjusted to the examination methods. In so-called Fluorescence Lifetime Imaging Microscopy (FLIM), a pulsed illumination system is necessary and very fast with digital signal processing in the pico second range. The pulse time, i.e. the time at which the molecules are excited to fluorescence, plays an important role. For this reason, processing of the signals usually occurs in different steps: for example the preprocessing is frequently performed in the detection module, while the final processing may occur in a computer for example. In order to determine the life of a fluorescence excitation, the time between the excitation and the detection of the signal must be determined.

A similar, special detection method is used for the fluorescence-correlation spectroscopic measurements (FCS-measurements). Here, bonding features of molecules are determined within the cofocal volume detected by a laser-scanning microscope. For this purpose, the emission signals of fluorescent molecules must be detected; here too the temporal progression and interval the signals are detected are of decisive importance.

For simultaneous or alternating use of several detection methods, the prior art suggests different solutions. In US 2006/0203241 A1, a device for the spectral selection and detection of spectral ranges of a light beam are disclosed, in which the light beam is split into several, even spectrally different, partial beams. Each of the partial beams impinges a different detector, with the detectors each having different detection features and/or different detection methods. This construction is very expensive because for each partial beam a separate detector with a separate optoelectronic converter is used.

From an article by W. Becker et al., "Proceedings of SPIE," vol. 4431, pages 94-98, a method for detecting an object with the help of a laser scanning microscope is known. The detection device includes two detection channels, with prior to the detection the signal first being split optically into two channels. Each of the channels has therefore a separate optoelectronic converter. A separate analysis device is connected to each converter.

In contrast thereto, the solution disclosed in DE 102 53 108 B4 shows an improvement. Here, the light is detected by a single detector, the detection signal is then distributed to two channels via highpass filters and/or lowpass filters. According to the disclosure of DE 102 53 108 B4, these filters are necessary to achieve a clean channel separation. In one of the two channels pulses are created by a pulse former, which serves for further processing. The detection signal originally connected to the input of the second channel no longer requires any attention, so that the second channel essentially acts as a pulse counter, which can also register the temporal intervals between the pulses. The system presented in DE 102 53 108 B4 is a very special detector, which can only be used for certain problem conditions, such as for example FCS-measurements.

The object of the invention is therefore to develop a method and an arrangement which has as wide a range of application as possible and can flexibly be adjusted to different examination conditions, in particular in microscopy and laser scanning microscopy.

BRIEF SUMMARY OF THE INVENTION

This object is attained in a method of the type mentioned at the outset in that one or more output signals being selected or output for further processing according to a specifiable, changeable selection criterion. For example, if a sample is examined under the microscope, the light coming from the sample is detected, whereupon regardless of the examination method, after it is split into several channels an analysis is made thereof in each channel. Only thereafter a selection of one or more signals is made. This way a user has various, flexibly selectable output signals available; however in principle a single detector is sufficient. Also during the measurement and/or its runtime, i.e. online, a switch can be effected in order to choose from one or more other analysis methods.

Here, the electric signals are advantageously individually amplified and/or filtered after their distribution to several channels. In particular in a distribution of the signal over a multitude of parallel channels, the amplitude of the signal drops, which can be compensated for by amplification. Furthermore, each signal can individually be filtered more or less or not at all in reference to the subsequent analysis as well as filtered by a highpass or a lowpass filter. In a particularly preferred embodiment of the method, the output signals are selected using a logic switch, preferably an FPGA (Field Programmable Gate Array). The logic switch is connected in accordance with the selected selection criteria, so that one or more output signals are selected. A programmable switch, such as the FPGA, allows maximum flexibility as well as rapid adjustment to changes in selection criteria.

Advantageously, the output signals are automatically selected using the selection criterion. For example, a user enters a selection criterion, if one has not already been specified automatically, which is transmitted to the logic switch, which then switches the signal lines such that the specified output signals are selected and transmitted. Of course, a selection of the signals manually by the user is possible.

Preferably, the output signals are output for further processing via an LVDS-interface (low voltage differential signaling interface). Using this interface the selection criterion is also transmitted to the logic switch and the logic switch is switched accordingly. In an LVDS interface, instead of the usual base voltages for digital systems that are approximately 5 Volts, lower voltages of approx. 1.2 Volts are used. Additionally two lines are used for signal transmission, with the difference of the voltages, approximately 0.3 Volts, being crucial for the logic state. The disadvantages of conventional interfaces, such as the appearance of high-frequency electromagnetic alternating fields in voltage and current fluctuations, can be avoided in this way.

An application for this method is preferably the microscopic or laser-scan microscopic examination of samples, with light emitted by the sample being detected. As already mentioned at the outset, in particular, there are many different examination methods, some of which need special signal analysis methods. Here beneficially the determination of selection criteria and the selection of the output signals occur depending on the selected examination method or methods. In other words, the selected examination method also determines a selection criterion or at least a part of a selection criterion. If, for example, seven selection channels with appropriate signal analysis methods are provided in the process, and a user selects a particular examination method, which preferably requires the signal processing of channels 3, 5, and 6, the selection criterion may comprise a series of seven binary digits and/or a seven-digit binary number, wherein the third, fifth, and sixth digit is 1 and the other digits are 0. This sequence/number may be transmitted via the interface to the logic switch, which then adjusts such that it selects the signals of the channels 3, 5, and 6 for transmission. The other signals are analyzed, though, but not further processed.

A user may now determine which examination methods should be used, for example by checking the appropriate check boxes in a selection menu at a connected PC or a control unit of the microscope. However, the selection of the analysis method and thus the determination of selection criteria can also occur automatically, when for example at the PC or the control unit, an appropriate examination method is selected for a sample. Here, too, an appropriate manual selection using a menu control is possible.

For microscopic and particularly laser-scan-microscopic applications there preferably occurs at least an oversampling analysis, an integration analysis, an FCS-analysis, a photon counting analysis, and/or an FLIM analysis. The number of different signal analyses provided is generally unlimited, more or less signal analyses may be provided depending on the purpose of the application of the method according to the invention.

Preferably a PMT is used as the optoelectronic converter, because of its wide range of application. Its sensitivity can be variably adjusted depending on the voltage provided so that for example at highest sensitivity individual photons can be registered, but also such that at low sensitivity exclusively high intensities can be registered, distinctly separating themselves form the background noise. In addition to PMT photon diodes or APD's (Avalanche-photo diodes), photon converters on a semiconductor base may also be used. The latter may also be provided as single-photon avalanche photodiodes (SPAPD) and are then exclusively suitable for counting photons, which are predestined for use in FCS measurements and life term measurements.

When the detection signal is optically distributed to several channels, several optoelectronic converters may be used, with specific signal analyses being connected to each of them. The converters with their analysis circuits may be integrated in a single detector module, in which at the input of the light initially an optic beam splitting occurs. The ultimate selection of the output signal for forwarding may also be performed by a single FPGA, though.

The invention also comprises a detector module for detecting and analyzing light signals, which comprise an optoelectronic converter for converting a light signal into an electric signal, connected to a distribution circuit for distributing the electric signal to several analysis channels with an analysis module in each analysis channel, which (i) performs a signal analysis, which are different from the signal analyses for the other selection channels, and (ii) creates an output signal. In such a detector module the object is attained in that a selection unit is provided in which one or more output signals are selected or output for further processing according to a specified selection criterion.

Initially, an optic signal is detected by an optoelectronic converter and converted into an electric signal. The electric signal is then distributed to different analysis channels, for which a distribution circuit is provided. In the simplest case, this represents a junction with an input and several outputs. Each output corresponds to an analysis channel. The signals of the various analysis channels are then each fed to an analysis module. Here, the signal is analyzed and an output signal is generated accordingly. In the last step the selection unit selects one or more output signals depending on a specified but changeable selection criterion and outputs them.

Such a detector module can be designed so that it can be used in different optic examination devices, such as telescopes, microscopes, material examinations, and other analysis arrangements. The selection criterion may for example be determined by a user when determining the examination method for a certain sample. A selection may occur via an interface or directly via one or more switches at the detector module itself. When the detector module is used, for example in a laser scanning microscope, the examination methods can be selected by a connected control unit. Depending on the selected examination method the selection criterion can then be automatically or manually be determined, for example via a menu control, and be transmitted to the detector module.

In contrast to the prior art, several selection principles are simultaneously implemented in one detector module, one or more of which can be selected in a flexible manner. The selection and switching may also occur during the measurement. Due to the fact that the preparation of the signals occurs directly in the detector module, signal processing times and transmission times are of minor importance. Since several measurements can occur simultaneously, stress on the sample is reduced.

Preferably, individually controllable signal amplifiers and/or frequency filters may be provided in the detector module for one or more analysis channels. In particular in case of a high number of selection channels, such signal amplification is useful after the distribution of the signal, because the signal has been weakened by the distribution. Using a filter, specific parts of the signal can further be filtered out. These filters of course may also be integrated in the selection module.

Preferably, a controllable selection switch is provided in the selection unit of the detector module. By control of the selection switch, depending on the selection criterion, output signals can be flexibly selected. It is particularly preferred for the selection switch to be implemented as an FPGA. This represents a freely programmable logic circuit that can be appropriately programmed by specifying the selection criteria. When the selection criteria are changed, an adjustment and/or reprogramming of the switch occurs in the FPGA. Instead of an FPGA, a CPLG (complex programmable logic device) or another programmable logic switch may be used.

Preferably, an LVDS interface can be provided at the selection unit for outputting the output signals as well as for transmitting the selection criterion to the selection unit. Other bi-directionally operating interfaces may also be used. When the detector module is used, for example with a laser scanning microscope (LSM), one or more selection criteria and/or output signals for determining the selection criterion can be selected, for example via a control unit provided at the LSM. Accordingly, this may of course also be performed as early as the selection of the examination method(s) without interference from the user. Then, via the LVDS-interface, a respective signal with the selection criterion is transmitted to the selection unit and the selection switch is programmed accordingly, so that only signals from the selection channels whose analysis modules implement the selected analysis methods are selected and forwarded to a PC for a graphic display, for example.

As an optoelectronic converter, a PMT (photomultiplier tube) is preferably provided at the detector module. In such tubes the voltage serving to multiply the secondary electrons can be adjusted over a wide range, thus making a PMT suitable both for high intensity as well as for individual photon measurements. Alternatively, other photon converters, such as photodiodes, APD, or SPAPD can be used as well.

Several different photon converters may be used simultaneously in the detector module; however, the detection beam must be appropriately optically distributed. For each converter, a separate switch for distributing selection modules must be provided but also a connection may be provided so that, for example, first the signals of one converter are processed and then the signals of the other converter are processed using the same selection module.

The use of line detectors or detectors in the form of arrays for the above-mentioned photon converters is possible as well, when for example the detection beam is spectrally split prior to the detection. The individual spectral channels are then consecutively analyzed with the same analysis module. Therefore for each spectral channel a separate analysis circuit may be provided having different analysis modules.

A common selection unit is provided for all selection channels. However, there is only a single interface by which the data is forwarded from the detector module.

For the use in microscopy, in particular in laser scanning microscopy, an oversampling, an integration, an FCS, a photon-counting, and/or an FLIM-module are provided as selection modules in the detector module. Further selection modules may also be and/or become integrated. Of course, however, fewer analysis modules may also be sufficient. The above-mentioned list includes the most common analysis methods, though. The detection module may also be embodied such that individual selection modules can be supplemented or exchanged. This is particularly advantageous when the space available is limited. When the selection modules are configured as plug-in modules, for example, an exchange is possible without any elaborate redesign or readjustment because the entire detector module is not exchanged.

The detector module according to the invention is particularly suitable for the use in a laser scanning microscope, because different examination methods can be realized, each of which requires different signal analysis methods. Such a laser scanning microscope, in which the detector module is used, usually has an adjustment or control unit, by which one or more examination methods can be selected to examine a sample. The selection criterion is then preferably set automatically using the selected examination methods and transmitted to the selection unit of the detector. The selection of the analysis method can alternatively also occur manually, for example by an appropriate menu control, via the control unit of the microscope.

BRIEF DESCRIPTION OF THE SEVERAL VIEWS OF THE DRAWINGS

In the following, the invention shall be explained in greater detail using an exemplary embodiment making reference to the following drawings in which.

DETAILED DESCRIPTION OF THE INVENTION

Figure 1:
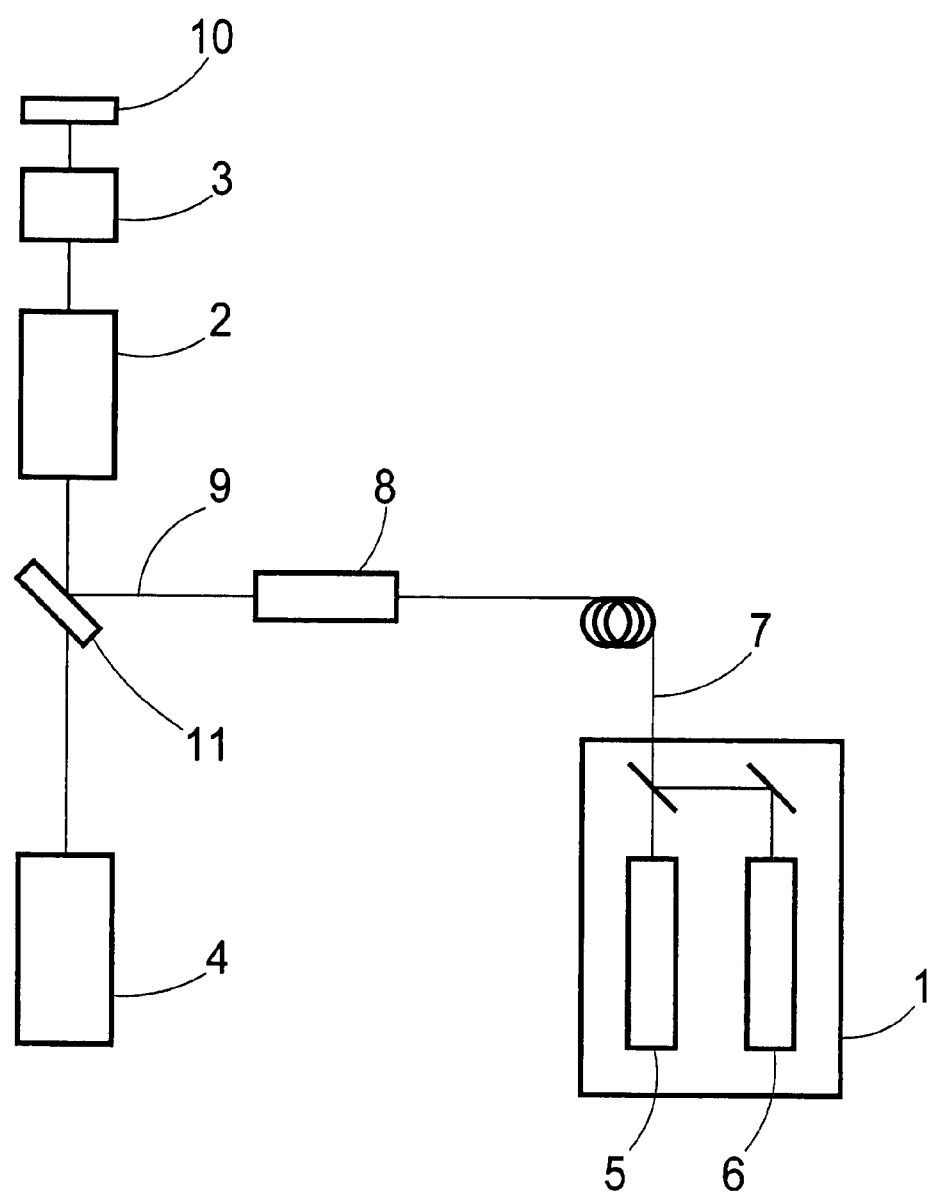
FIG. 1 is a schematic diagram of an LSM with a detector module according to the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

In FIG. 1, the structure of a laser scanning microscope (LSM) is shown. The LSM essentially comprises five components, namely a light source module 1, a scanning module 2, a microscope module 3, as well as a detector module 4. Illumination radiation is created in the light source module 1. Depending on the application, one or more suitable light sources may be provided. In the light source module 1, shown exemplarily in FIG. 1, two lasers 5, 6 are provided as light sources. Light of the lasers 5 and 6 is coupled into a light conducting fiber 7 via a coupling site, not shown. Upstream of the lasers 5 and 6, a light valve may be provided for each laser in order to switch off one or both laser beams without having to switch off the laser.

In a radiation-forming unit 8, the radiation of different wavelengths is first collimated and then changed with regard to the radiation profile so that the beam, when emitted, illuminates an essentially rectangular field in a profile level, for example, with the distribution of the intensity along the longitudinal axis of the rectangular field not being equivalent to the distribution of a formal curve but to a square wave. This linear beam is suitable to create a square wave illuminated field in the cross-section. The beam emitted by the radiation forming unit 8 serves as an illumination beam 9 for illuminating a sample 10. For this purpose, the illumination beam 9 is deflected via a primary color splitter 11 to the scan module 2. Here, the illumination beam 9 is deflected according to an instruction before it is deflected via the microscope module 3 to the sample 10 in the focus of a lens (not shown) of the microscope module 3 so that the sample 10 can be scanned. Emitted radiation from the sample 10 in the focus, for example a reflecting radiation or excited fluorescence radiation, returns into the scan module 2 via the microscope module 3. Here, the time-varying beam is reconverted into a stationary beam, the radiation emitted by the sample being "de-scanned." After leaving the scanning module 2 the light emitted by the sample passes through the primary beam splitter 11 and impinges the detector module 4. Here the light emitted by the sample is detected and analyzed. This may be provided in the detector module 4 that light of different wavelengths is selectively analyzed spectrally.

Figure 2:
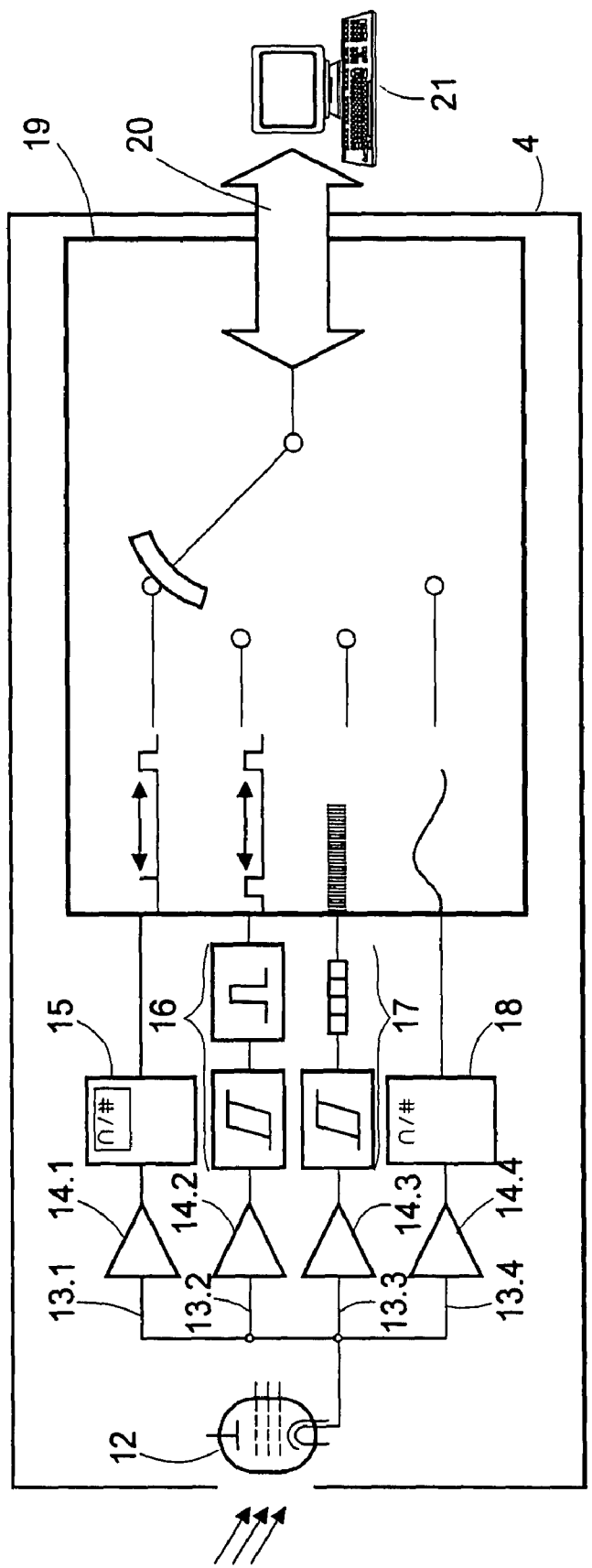
FIG. 2 is a schematic diagram of the detector module in detail, in a first position of a selection switch.

The design of the detector module 4 is shown in FIG. 2, for example. From the left, light indicated by the arrows impinges an optoelectronic converter, which here is embodied as a pentode tube 12. The use of other converters alternatively or simultaneously is also possible, of course. The electric signal emitted by the pentode tube 12 is distributed to four analysis channels 13.1 through 13.4. In each of these channels the signal then passes an appropriate amplifier 14.1 through 14.4, where the amplifiers 14.1 through 14.4 can be individually controlled. Subsequently the electric signals are analyzed by specific analysis modules 15 through 18.

In the example of the FIG. 2, a figure regarded as fundamental, four modules are shown, however, more or fewer modules, or modules with other functions, can also be provided. First an FLIM module 15 is provided, by which the life of a fluorescence excitation can be measured in the sample. An FCS-module 16 is used in fluorescence correlation spectroscopy. Here, basically, the time intervals between the registered light pulses are ascertained. Using the photon counting module 17 individual photons can be counted. Finally, an oversampling module 18 is provided by which an oversampling analysis of the signal, or alternatively a simple integration, can be performed. This may also be performed by another module for an odd-even integration. The output signals created by the analysis modules 15 through 18 are transmitted to an FPGA 19. There, they are held until needed. Which signals are retrieved and forwarded for further processing and analysis is decided according to a selection criterion, which is transmitted to FPGA 19 by a control unit 21 via an LVDS interface 20. The control unit 21 may be integrated into the LSM, and in the example shown is an external PC. The selection criterion is specified either by means of the examination method or manually, and the FPGA 19 is programmed accordingly and/or the circuit is switched based on the signal using the selection criterion. In the present case, should a user want to perform a fluorescence lifetime measurement, the selection criterion would accordingly be automatically specified and only the output signal created by the FLIM module 15 is output by the LVDS interface 20.

Figure 3:
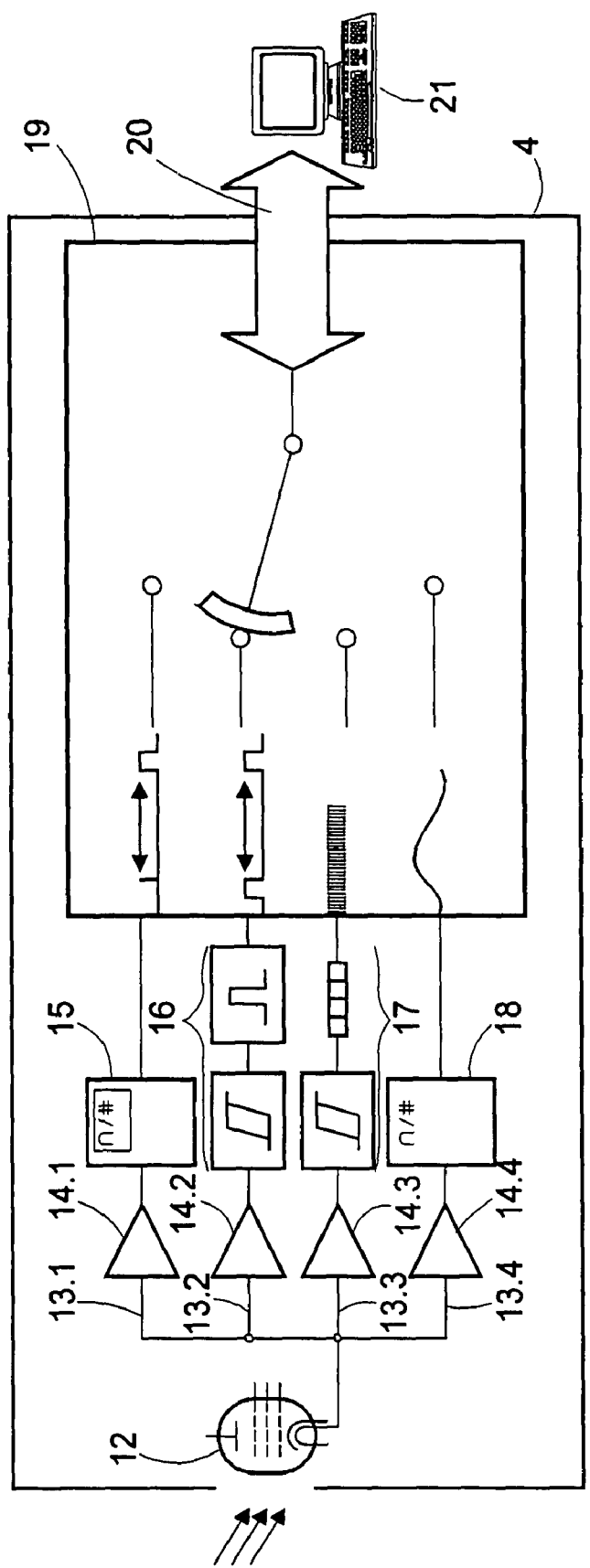
FIG. 3 is a schematic diagram of the detector module in detail in a second position of the selection switch.

In FIG. 3 the detector module is shown as to be adjusted for an FCS measurement. Only the signal from the analysis channel 13.2 with the FCS-module 16 is forwarded.

The detector module shown in FIGS. 2 and 3 is to be considered only an example, with an appropriate specification of the selection criterion, output signals may also be forwarded from different analysis modules 15 through 18 and be output. Additionally the measurement period during the progression of different measurement methods may be changed. For this purpose, either a new selection criterion is transmitted to the FPGA 19 at specified intervals, or the selection criterion transmitted at the beginning includes a command for the timed switch, which then takes place automatically.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE CHARACTERS 1 light source module
2 scanning module
3 microscope module
4 detector module
5, 6 laser
7 light conducting fiber
8 beam forming unit
9 illumination unit
10 sample
11 primary color splitter
12 pentode tube
13.1-13.4 analysis channels
14.1-14.4 amplifier
15 FLIM module
16 FCS module
17 photon count module
18 oversampling module
19 FPGA
20 LVDS interface
20 control unit

The invention claimed is:
1. A detector module for detecting and analyzing light signals, comprising:
an optoelectronic converter for converting a light signal into an electric signal;
a plurality of analysis channels, wherein each analysis channel includes an analysis module, which performs a signal analysis, that is different from the signal analysis of the other analysis channels, and generates an output signal;

a distribution circuit connected to the converter for distributing the electric signal from the optoelectronic converter to the plurality of analysis channels; and a selection unit, in which a subset of the output signals generated by the analysis channels is selected for output and further processing using a specified, changeable subset of selection criteria.

2. The detector module according to claim 1, wherein the selection unit is provided with a controllable selection switch for selecting the subset of the output signals.

3. The detector module according to claim 2, wherein the selection switch comprises an FPGA.

4. The detector module according to claim 1, further comprising an LVDS interface for outputting the selected subset of the output signals to the control unit as well as for transmitting the subset of selection criteria from the control unit to the selection unit.

5. The detector module according to claim 1, wherein the optoelectronic converter comprises a photomultiplier tube (PMT).

6. The detector module according to claim 1, wherein the analysis modules include an oversampling module, an integration module, an FCS module, a photon counting module, and an FLIM module.

7. A laser scanning microscope comprising a detector module according to claim 1 and a control unit for adjusting and selecting a subset of examination methods for examining a sample.

8. The laser scanning microscope according to claim 7, wherein the control unit automatically determines the subset of selection criteria using a selected subset of examination methods and wherein the subset of selection criteria is transmitted to the selection unit of the detector module.

9. The detector module according to claim 1, further comprising an interface arranged downstream of the selection unit for outputting the selected subset of the output signals from the selection unit.

10. The detector module according to claim 9, wherein there is only a single interface by which the selected subset of the output signals is transmitted from the detector module.

11. The detector module according to claim 9 wherein the interface is bi-directional for also transmitting the subset of selection criteria to the selection unit.

12. A laser scanning microscope comprising a detector module according to claim 9 and a control unit for receiving the selected subset of the output signals from the selection unit via the interface, wherein the control unit is not part of the detector module.

13. The laser scanning microscope according to claim 12, wherein the control unit, and only the control unit, performs a graphic display of the selected subset of the output signals.

14. The detector module according to claim 1, wherein in the selection unit, a single the output signal generated by the analysis channels is selected for output and further processing using a specified one of the selection criteria.

15. A method for detecting and analyzing light signals coming from an examined sample, using the detector module of claim 1, the method comprising the steps of:

impinging a light signal on the optoelectronic converter;

converting the light signal into an electric signal using the optoelectronic converter;

subsequent to the conversion, distributing the electric signal to the plurality of analysis channels, using the distribution circuit;

within each analysis channel, performing a signal analysis, which is different from the signal analyses for the other analysis channels, and generating an output signal, using the analysis module;

using the selection unit, selecting a subset of the output signals for further processing, depending on the specified, changeable subset of selection criteria;

holding the output signals that are not selected in the selection unit; and outputting only the selected subset of the output signals from the selection unit.

16. The method according to claim 15, further comprising the step of individually amplifying and/or individually filtering the electric signals after the distributing step and before the step of performing a signal analysis.

17. The method according to claim 15, wherein the selection unit includes a logic switch, and wherein in the selecting step, the subset of the output signals is selected using the logic switch.

18. The method according to claim 15, wherein in the selecting step, the subset of the output signals is automatically selected using the subset of selection criteria.

19. The method according to claim 18, further comprising the step of determining the subset of selection criteria depending on one or more selected examination methods.

20. The method according to claim 15, wherein the detector module further includes an LVDS interface, and wherein in the outputting step, the LVDS interface outputs only the selected subset of the output signal, and wherein the method further comprises the step of further processing the selected subset of the output signals output via the LVDS interface.

21. The method according to claim 15, further comprising the step of detecting the light coming from the examined sample using a microscope.

22. The method according to claim 15, wherein in the step of performing a signal analysis, the signal analysis includes at least one of an oversampling analysis, an integration analysis, an FCS analysis, a photon counting analysis, and an FLIM analysis.

23. The detector module according to claim 15, wherein in the converting step, a photo multiplier tube is used as the optoelectronic converter.

24. The method according to claim 15, wherein the detector module further includes an interface arranged downstream of the selection unit, and wherein in the outputting step, the selected subset of the output signals is output from the selection unit over the interface.

25. The method according to claim 24, further comprising the step of transmitting the subset of selection criteria to the selection unit over the interface, prior to the outputting step.

26. The method according to claim 22, wherein in the outputting step, the selected subset of the output signals is transmitted by the interface to a control unit which is not part of the detector module.

27. The method according to claim 26, further comprising the step of graphically displaying the selected subset of the output signals using only the control unit.

28. The method according to claim 15, further comprising the step of selecting a different subset of the output signals for further processing using the selection unit, depending on a change in the specified, changeable subset of selection criteria.

29. The method according to claim 15, wherein in the selecting step, a single output signal is selected.

* * * * *